United States Patent [19]
Allen

[11] 3,858,713
[45] Jan. 7, 1975

[54] LOG FEED CONVEYOR FOR BANDMILL
[75] Inventor: Francis Edwin Allen, North Vancouver, British Columbia, Canada
[73] Assignee: Letson and Burpee Ltd., Vancouver, British Columbia, Canada
[22] Filed: Dec. 28, 1971
[21] Appl. No.: 213,139

[52] U.S. Cl. .............. 198/200, 198/178, 198/189
[51] Int. Cl. ........................................... B65g 15/42
[58] Field of Search ............... 198/189, 200, 178; 143/135

[56] References Cited
UNITED STATES PATENTS

| | | | |
|---|---|---|---|
| 223,904 | 1/1880 | Gleason | 198/200 |
| 885,959 | 4/1908 | Schilleman | 198/200 |
| 3,022,588 | 2/1962 | Brown | 143/135 B |
| 3,202,267 | 8/1965 | Watters | 198/200 |
| 3,278,000 | 10/1966 | Anson | 198/189 |
| 3,319,773 | 5/1967 | Tannerstal | 198/200 |
| 3,395,741 | 8/1968 | Miller | 143/135 |
| 3,513,964 | 5/1970 | Imse | 198/189 |

Primary Examiner—Evon C. Blunk
Assistant Examiner—Joseph E. Valenza
Attorney, Agent, or Firm—Carver and Company

[57] ABSTRACT

Conveyor for feeding logs rectilinearly with negligible rotation through bandmills. Chain has flanged links with flanged side bars, alternating with the connecting links, and runs on chainway. Flanged side bars straddle spaced parallel side walls of chainway and reduce rotation and lateral deviation of link. Wear block extends between side bars and transfers load on chain to upper wall of chainway. Connecting link and chain tension reduce rocking of flanged link about transverse axis. Lugs to hold logs on flanged link have converging side walls spaced symmetrically about theoretical resultant velocity vector of log falling onto moving chain.

6 Claims, 6 Drawing Figures

PATENTED JAN 7 1975
3,858,713
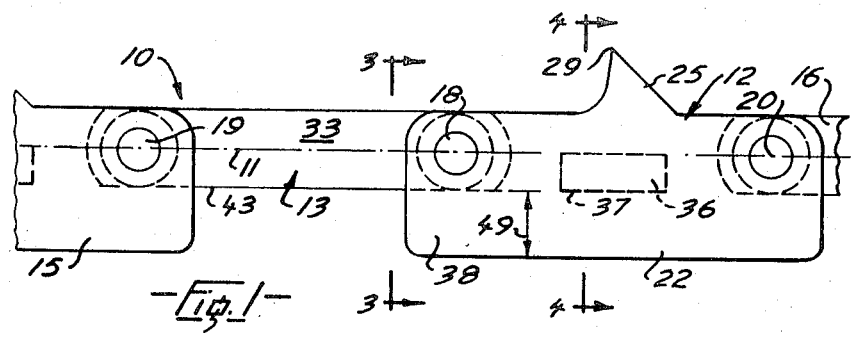
-Fig. 1-
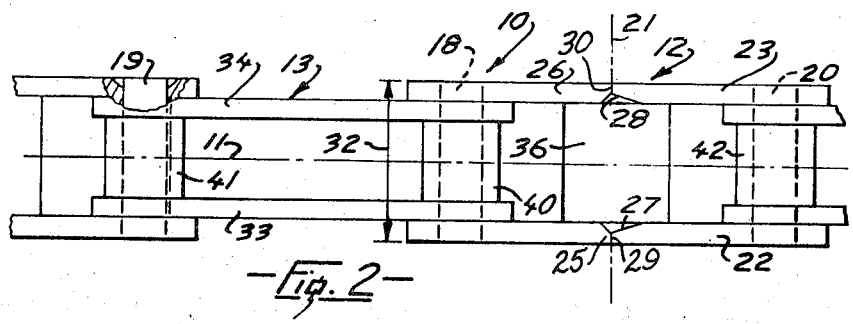
-Fig. 2-
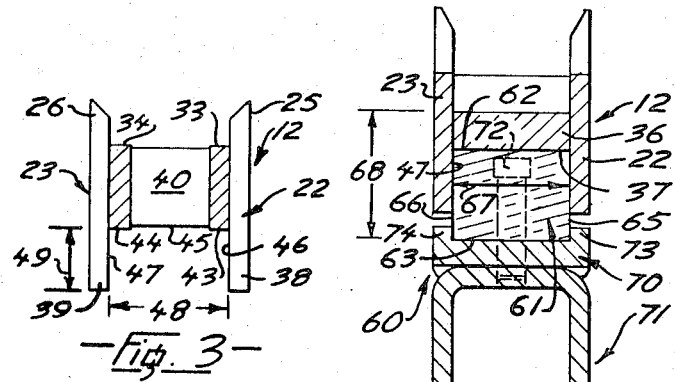
-Fig. 3-
-Fig. 4-
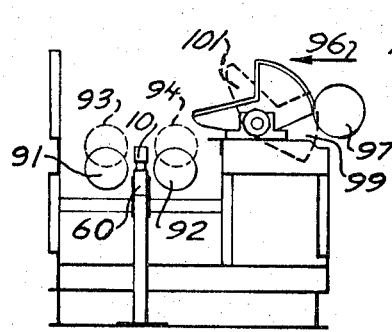
-Fig. 5-
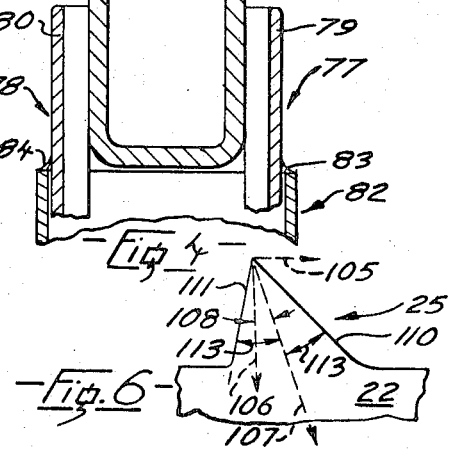
-Fig. 6-

LOG FEED CONVEYOR FOR BANDMILL

BACKGROUND OF THE INVENTION

1. Field of the Invention

The invention relates to a conveyor chain for use in lumber industry, and in particular to a high precision feed chain for feeding logs through twin or quad bandmills.

2. Prior Art

Conveyor chains have been used for many years and are commonly a relatively erratic and imprecise means of feeding logs. Often small transverse movements of the chain, inherent due to wide manufacturing tolerances of links and chainways, produce lateral shifting of the logs. If the logs are feeding through a saw, such lateral shifting relative to saw blades can deflect the saw, resulting the inaccurate cuts and possible damage to the saw.

A twin bandmill has two bandmills spaced on either side of a feed conveyor chain, saws of the bandmills straddling the chain. The saws are spaced apart, or set, at a distance somewhat greater than maximum width of the chain, providing clearances between the chain and the saws. Hereinafter chain width refers to maximum horizontal measurement normal to a longitudinal axis of the chain, which measurement includes heads of pins. Spacing of the saws determines width of a cant produced, thus minimum cant width is determined primarily by the chain width.

Commonly, conveyor chains have links that articulate on pins welded or riveted on outer sides of the links. Manufacturing tolerances for some components are relatively large, and a chain so manufactured does not run true relative to the longitudinal axis of the chain. Also such chains of equal strength generally have a minimum width of no less than 4½ inches, thus limiting minimum setting of a twin bandmill to about 5 inches, to provide sufficient clearance for lateral movements of the chain to reduce risk of the saw interfering with the chain.

Sometimes a conveyor chain runs in a chainway formed from an I-section girder having a web and two parallel flanges. Lower edges of the side bars of the link slide along the web of the girder, being retained in the girder by chain tension and the flanges. As the side bars are relatively thin, area of contact between the link and the girder is small, resulting in high bearing pressures and rapid wear.

Logs are often held on the chain by upwards extending lugs on the links. Should a curved log be held on the lugs of the chain, resultant assymetric loading can cause the chain to twist. That is to say the links under the curved log can rotate a few degrees about lower edges of the side bars on one side of the chain under the log. Such rotation is usually resisted mainly by the chain, produces curved cuts, and loads the bandsaw laterally with a risk of interference between the saw and the chain, possibly causing loss of the saw.

SUMMARY OF THE INVENTION

The present invention teaches a high precision conveyor chain which reduces difficulties and disadvantages above by providing a chainway which is accurately laid and adapted to reduce lateral and rotational movement of the links sliding along it. The chainway has a horizontal upper wall to bear weight of the chain, and, in one embodiment, has two parallel vertical side walls. The chain has first or flanged links which alternate with connecting means of the chain, which links have flanges extending downwards from side bars to straddle the chainway. The flanges restrain the link against twisting or rotating when subjected to assymetrical loading, or against lateral shifting. In the first links a wear block extends between the side bars and is adapted to run on the upper wall of the chainway, thus bearing pressures between the chain and the chainway are reduced by providing a relatively large bearing area. The connecting means include second or connecting links which alternate with the first links, lower edges of the second links sliding on the chainway reducing tendency of the first links to rock about a transverse axis.

Barrels of the second links are secured flush to side bars of the second links and are straddled by side bars of the first links, which side bars have upwards extending lugs. The lugs are integral with the side bars and at an angle to increase penetration of the lug into the log when compared with prior art spiked chains.

Such construction above produces a narrower chain than the prior art, having substantially rectilinear motion on the chainway with negligible rotation, permitting close setting of twin bandmills to produce narrow cants with improved dimensional tolerance, hereinafter "narrow" refers to such cants having a width of less than 4 inches.

A detailed description following related to drawings gives exemplification of embodiments of the invention which, however, is capable of being expressed in structure and mechanism other than that particularly described and illustrated.

DESCRIPTION OF THE DRAWINGS

FIG. 1 is a fragmented side elevation of a portion of a conveyor chain according to the invention, FIG. 2 is a top plan view of the chain of FIG. 1, FIG. 3 is a section on 3—3 of FIG. 1, FIG. 4 is a section on 4—4 of FIG. 1, the chain being shown supported on a chainway assembly, portions of the chainway supports being shown, FIG. 5 is a section along a centre line of an infeed conveyor showing prior art log loading means, FIG. 6 is a detail of lug of a link according to the invention.

DETAILED DISCLOSURE

FIGS. 1, 2, and 3

A portion 10 of a chain according to the invention has a central longitudinal axis 11 within a central longitudinal plane, and has two types of links, namely a first or flanged link 12, and a second or connecting link 13. The two types of links alternate along the chain, portions of a similar flanged link 15 and a similar connecting link 16 being shown.

The link 13 is secured to the links 12 and 15 by pins 18 and 19 as shown and a pin 20 secures the link 12 to the link 16.

The link 12 has a transverse axis and two spaced parallel side bars 22 and 23 provided with upward projectiong hardened lugs 25 and 26 respectively. The lugs are integral and co-planar with the sidebars and have inwardly sloping surfaces 27 and 28 with knife edges 29 and 30; structure of the lugs is shown in FIG. 6.

The side bars 22 and 23 of the link 12 are spaced so as to straddle the link 13. Outer walls of the side bars 22 and 23 are spaced at a dimension 32, FIG. 2 i.e., overall width of the link 12. A wear block 36 extends between and is secured to the side bars 22 and 23 of the link 12, a lower wearing surface 37 of the block (broken outline in FIG. 1) being adapted to slide on a chainway, to be described with reference to FIG. 4. The lugs are positioned above and transversely disposed from the wear block 36.

The pins 18 and 19 are secured in holes in the side bars 22 and 23, so as to prevent relative rotation, a typical means of securing being welding, as shown with reference to the pin 19 of the link 15 FIG. 2. Excess weld material is ground off flush with outer surfaces of the side bars so as not to project proud of the dimension 32, which dimension thus is within maximum width of the chain. Portions of the side bars 22 and 23 below the surface 37 as viewed in FIG. 1 are referred to as flanges 38 and 39, the side bars being referred to as flanged side bars, functions of which are further described with reference to FIG. 4. Thus the wearing surface 37 of the wear block extends in a plane normal to and between the flanges. Note that overall width of the link 12 across the flanges is equal to overall width of the link 12 across the lugs.

The connecting link 13 has spaced parallel connecting side bars 33 and 34, and spaced barrels 40 and 41. The barrels are secured at opposite ends of the side bars and have bores aligned with bores of the side bars, the bores being of a diameter sufficient to permit rotation of the connecting link 13 relative to the pins 18 and 19, thus permitting articulation of the chain. The link 16 has a barrel 42, similarly journalled on the pin 20. The connecting link is adapted to mesh with teeth of a gap tooth sprocket (not shown), so as to drive the chain. Such a sprocket has alternate teeth removed to provide clearance for the wear block 36.

When the chain is under tension and in a straight line, hereinafter termed adjacent links aligned, lower surfaces 43 and 44 of the connecting side bars 33 and 34 are coplanar with the wearing surface 37 of the wear block 36. This is to ensure that load of the chain on the chainway is distributed over a relatively large area, which area is the sum of the areas of the wear blocks of the flanged links plus the sum of areas of the lower surfaces of the connecting side bars. As seen in FIG. 3, the lower surfaces 43 and 44 of the side bars stand proud of a lowest portion 45 of the barrel 40, ensuring that the barrel does not bear against the chainway.

The flanges 38 and 39 of the side bars 22 and 23 have oppositely facing inner side walls 46 and 47 spaced at a distance 48, the flanges extending downwards a depth 49 from the surface 37 of the wear block 36 as shown, in which the depth 49 is approximately equal to at least one-half of the distance 48.

FIG. 4

The chain 10 is adapted to run in high precision chainways such that, when the chain is under tension, maximum lateral deviation of the chain relative to the chainway is within about five-thousandths of an inch.

A section through a typical chainway assembly 60 is shown in FIG. 4, the assembly having a length determined by feed requirements. Joints (not shown) between adjacent sections are staggered, and secured by common fish plate means.

A chainway 61 has horizontal upper and lower walls 62 and 63, and spaced vertical side walls 65 and 66 equally spaced from the central longitudinal plane (not shown) of the chain, the chainway being rectangular in section as shown. The chainway can be hardened alloy steel or cast iron to reduce wear from sliding of the links.

Horizontal spacing of the vertical side walls 65 and 66, i.e., width 67 of the chainway, is a few thousandths of an inch less than the space 48 between the flanges 38 and 39, clearance existing between the flanges and the chainway permitting free axial sliding along the chainway with little tendency of the link to tilt or rotate about a longitudinal axis, or deviate laterally.

The chainway assembly 60 includes a chainway cradle 70 supported on and welded to a box section girder 71. The chainway is fitted in the cradle 70, the lower wall 63 of the chainway being secured firmly against the cradle by cap screws 72, one only being shown in broken outline. Upwards extending parallel flanges 73 and 74 augment restraint against lateral movement of the chainway relative to the cradle. The chainway 61 has a depth 68 somewhat greater than the depth 49 of the flanges (FIG. 3), permitting free sliding of the link 12 along the chainway without interference between lower portions of the side bars 22 and 23 and the flanges 73 and 74 of the cradle 70. The lower surface 37 of the wear block 36 bears on the upper wall 62, supporting the link and the log carried on the lugs of the link, to be described with reference to FIG. 6. The lower surfaces 43 and 44 of the connecting links, being coplanar with the surface 37, also bear on the upper wall 62 of the chainway, reducing chances of the link 12 rocking longitudinally on the wear block, i.e., rocking or rotating about the axis 21.

As can be seen the flanges 38 and 39 serve as guide means co-operating with the chainway to restrict the link essentially to motion of translation only within a central longitudinal plane containing the longitudinal axis 11. This accounts for one degree of freedom of translation of the link 12, remaining degrees are discussed below.

Rotation of the link is also restrained by the flanges, this restraint is against rotation about the longitudinal axis, and also about a vertical axis (not shown) passing through the link. This accounts for two degrees of freedom of rotation, restraint being augmented also by chain tension.

The wear block 36 bears against the upper wall 62 of the chainway due to gravity, weight of logs on the chain or partly due to chain tension, such factors being force closure restricting two further degrees of freedom. These two further degrees of freedom are translation of the link out of the horizontal plane containing the axes 11 and 21 and also rotation of the link about the transverse axis 21. Rotation about the transverse axis is however mainly restricted by the lower edges of connecting links bearing against the chainway and supporting each end of the link, which lower edges serve as steadying means to restrain the link against rocking.

Thus five restraints against the six degrees of freedom are provided, resulting in essentially rectilinear motion of the chain, accuracy of which motion is determined by manufacturing tolerances and fit between the chain and chainway.

The girder 71 extends under the chainway, providing rigid support to bear the weight of the chain and logs on the chain, and means to secure legs to carry the chainway. The girder is set up so that the upper wall 62 of the chainway provides an accurately horizontal, warp free, and straight, chainway for the chain. The wall 62 is thus used as a datum face for setting up the chainway, and, because the side walls 65 and 66 are integral with chainway 61, these side walls are likewise accurately set up. The girder has vertically downwards extending legs spaced along its length, two such legs 77 and 78 being shown in section welded to the girder 71. The legs 77 and 78 are fabricated from a channel section, webs 79 and 80 of the channel being spaced from and parallel to vertical side walls of the girder 71. The legs 77 and 78 face each other producing a pair of parallel legs with two parallel outer surfaces formed of the webs.

Spaced stanchions extend along and underneath the girder 71, a typical stanchion 82 being shown. The stanchion has a box section which accepts concurrently the legs 77 and 78 in a sliding fit, with about one-eighth of an inch of clearance between the webs 79 and 80 and inner side walls of the stanchion to permit the legs 77 and 78 to move within the stanchion. Such movement is required for final alignment of the upper wall 62 of the chainway, which final alignment can be obtained by using optical means and precision levels. An alternative alignment means is to use electronic micrometers extending between a taut wire, which wire is used as a datum for aligning the chainway, thus producing a relatively warpfree, flat surface to guide the chain through the saw.

For setting up, initially the box section girder is supported on jacks, the legs 77 and 78 sliding in the stanchions, the jacks being operated to attain required alignment. When the chainway wall 62 and one side wall 65 or 66 comes within the required tolerance, the legs 77 and 78 are tack welded to the stanchion 82, as shown at 83 and 84. After removing the jacks, the alignment is once again checked to ensure negligible warping after welding. Final welding is then carried out at 83 and 84, securing the legs to the stanchions. All legs supporting the chainway assembly are similar to the legs 77 and 78, and are welded to stanchions producing a rigid and accurately aligned chainway, formed of sections about 10 to 20 feet long. Such a chainway assembly can be economically maintained, worn chainways being replaced easily.

FIG. 5

The chain 10 is used as a feed conveyor for feeding logs through twin or quad handmills, but can be used in other applications requiring accurately fed lumber or like material. Logs are carried on the lugs 25 and 26, the logs having been dropped a controlled height onto the lugs whilst the chain is moving, as is common practice. Such dropping is by conventional common turning rolls 91 and 92, which rolls are adapted to slide vertically a distance of about 3 or 4 inches from a raised position, shown in broken outline at 93 and 94. Logs to be fed through the saw are fed in a direction shown by an arrow 96 onto the rolls in the positions 93 and 94, a typical log 97 being shown in end view. A common log stop and unloader 99 has a cut-out 101 adapted to accept logs. The stop 99 stops the log, and engages it in the cut-out 101, then feeds the log onto the turning rolls 91 and 92 in the raised position 93 and 94. An operator rotates the log on the rolls so that the log appears relatively straight when viewed from above. The rolls then drop quickly to the lowered position, the log following and being impinged on several lugs (not shown in FIG. 5) of the chain 10.

FIG. 6

As the log 97 (FIG. 5) falls, it accelerates in a vertically downwards direction until it hits the lugs of the chain, which lugs are travelling horizontally at a substantially constant velocity. With a particular log, the lugs penetrate the log to a depth determined by a relative speed between the log and the chain, other factors being constant. The relative speed has two components; a horizontal component being the chain velocity, designated 105, and a vertical component, being the final velocity of the log just before impingement, designated 106. The theoretical resultant of these two components can be predetermined and is designated 107 and is at an angle 108 to the vertical. The lug is disposed symmetrically about the predetermined theoretical resultant 107, that is, side walls 110 and 111 of the lug are at angles 113, about 27°, to the resultant 107. The angle 113 of the side walls relative to the resultant depends on lumber hardness, size of log and other factors.

Such symmetrical disposition of the lug side walls about the resultant 107 increases depth of penetration of the lug into the log normal to the log axis, and reduces chance of the log falling off the lugs.

ALTERNATIVES AND EQUIVALENTS

The link 13 has the side bars 33 and 34 secured by the barrels 40 and 41, the lower edge surfaces 43 and 44 being adapted to run on the chainway upper wall 62 supporting and interconnecting ends of the first links. Clearly other means of connecting the first links can be used, for instance a slide block (not shown) adapted to engage the link and to register with the aligned bores of the first link. The connecting means has a lower surface adapted to run on a chainway similar to the lower edge surfaces 43 and 44. When adjacent links are aligned, the lower surface of the connecting means is adapted to be coplanar with the wearing surface of the wear block of the first link so as to restrain the first link against rotation about the transverse axis, thus serving as a steadying means. If the wearing surface extends along the first link, such steadying is attained from the wearing surface, and not from the connecting link, thus the connecting means can slide clear of the chainway. Such a slide block has clearance, if required, for teeth of the gap tooth sprocket (not shown) or alternatively the first link is adapted to mesh with the sprocket teeth.

The wear block 36 serves as a wear means to distribute bearing loads and restrain motion of the link to translation within a plane parallel to the upper wall of the chainway. Other wear means can be substituted, such as integral flanges (not shown) extending inwards from the side bars, the flanges having sufficient area to reduce bearing loads.

The flanges 38 and 39 are parallel to be complementary to the parallel side walls 65 and 66 of the chainway. Parallel refers to the side walls as viewed in FIG. 3, that is an angle between each side wall and the upper wall is 90°. Inclined flanges at an angle other than 90° and spaced equally from the central longitudinal plane of the chain would require complementary inclined side walls of the chainway. Hereinafter and in the claims, a complementary chainway refers to a chainway having side walls and an upper wall complementary to, that is, at similar angles to, the flanges and wear surfaces of the links.

In certain applications it may be of advantage to use downwards and outwards inclined side walls as above, particularly in an application where a chain runs freely between two points and moves generally normally into engagement with a chainway spaced from the chain. Inclined flanges tend to centralize the chain to the chainway with normal engagement as above. With parallel flanges and parallel side walls movement normally into engagement with close tolerance chains and chainways might result in binding or jamming. Links having flanges that converge downwards and inwards have a particular application with chains having a tendency to lift off the chainway. In such instances the chainway is V-sectioned, so as to complement the flanges.

The first or flanged links have the lugs 25 and 26 which are adapted to penetrate and to retain a log, further support being from other spiked links. In some applications the lugs 25 and 26 can be eliminated, log chairs, flights, or other means being substituted to retain lumber, etc., on the chain. Likewise the lugs 25 and 26 having the converging side walls spaced symmetrically about the resultant velocity vector can be used on other chains without flanges, which, whilst improving retention of logs on the chains, does not have the advantages accruing from flanged chain running on a complementary chainway.

The chain as described is particularly adapted for use in feeding logs through twin or quad bandmill producing narrow cants. However links with flanges complementary to a precision chainway can be used in applications requiring larger links with precision feed requirements.

I claim:

1. A conveyor chain having a central longitudinal axis within a central longitudinal plane, the chain being adapted to run on a complementary chainway, the chainway having an upper wall, and side walls spaced equally from the central longitudinal plane, spacing between the side walls defining width of the chainway; the chain having flanged links and connecting links with transverse axes normal to the chain longitudinal axis and in a plane parallel to the upper wall of the chainway, the flanged links alternating with the connecting links along the chain; each flanged link including:
   a. a pair of spaced parallel side bars having opposite ends having transversely aligned bores, the side bars having spaced, parallel flanges having oppositely facing inner sidewalls spaced apart by a distance somewhat greater than the width of the chainway so as to straddle the side walls of the chainway and to provide clearance between the flanges and the chainway permitting axial sliding of the links on the chainway, the flanges extending downwards from the side bars to lower edges of the flanges spaced downwards from the upper wall of the chainway when the link engages the chainway at a depth sufficient to restrain the flanged link against rotation about the longitudinal axis, and maintain the flanged link within the central longitudinal plane, each side bar having an upwardly extending lug positioned above and transversely disposed from the wear block and adapted to penetrate a log and retain the log on the chain, each side bar, flange and lug have coplanar parallel inner and outer side walls,
   b. a wear block extending between the side bars, the wear block having a lower surface serving as a wearing surface, which surface is adapted, under downward force closure arising from weight of material carried on the chain, to bear against the upper wall of the chainway, the lower surface of the wear block being spaced between the lower edges of the flanges and the transversely aligned bores and having a relatively large surface area so as to result in relatively low bearing pressures, and each connecting link having:
   c. connecting means adapted to engage the flanged link, the connecting means having: opposite ends having a width to be accepted between the side bars of the flanged links; bores at the opposite ends adapted to register with the aligned bores of the flanged link; and a lower surface which surface, when adjacent links are aligned, is coplanar with the lower surface of the wear means and bears against the upper wall of the chainway, so as to restrain the flanged link against rotation about a transverse axis and support a portion of weight on the chain:

the chain further including:
   d. pins adapted to pass through the bores in register so as to hinge together the flanged and connecting links, so that motion of the chain along the chainway is essentially rectilinear motion of translation only, and, when required, the connecting link can rotate about a transverse axis relative to the flanged link permitting articulation of the chain.

2. A chain as defined in claim 1 wherein the lower surface of the wear block extends in a plane normal to the inner sidewalls of the flanges so that overall width of the link across the flanges is equal to overall width of the link across the lugs.

3. A chain as defined in claim 1 wherein the flanges extend to a depth approximately equal to at least one-half of the spacing between inner side walls of the flanges.

4. A chain as defined in claim 1 in which the lugs have:
   i. converging side walls spaced symmetrically about a theoretical predetermined resultant velocity vector, the vector being the resultant of two components, a vertical component being velocity of a log falling onto the chain an instant before impingement on the lug, and a horizontal component being the velocity of the chain.

5. A chain as defined in claim 1 in which the connecting means of the connecting link includes:
   i. spaced, parallel, connecting side bars having lower edge surfaces coplanar with the lower surface of the wear block and the side bars having opposite ends having transversely aligned bores,
   ii. barrels having bores, the barrels secured at the opposite ends of the side bars so that the bores of the barrels are aligned with the bores of the side bars,
so that the side bars of the flanged link straddle the side bars of the connecting link, and the aligned bores of the flanged link are adapted to register with corresponding bores of the connecting link so as to accept the pin.

6. A chain as defined in claim 1 further including:
   e. a chainway adapted to cooperate with the chain, the chainway having a central longitudinal plane coincident with the central plane of the chain, the chainway further including:
   i. an upper wall adapted to be in sliding contact with the lower surface of the wear block of the flanged link and the lower surface of the connecting means,
ii. a pair of side walls equally spaced from the longitudinal plane and extending downwards from the upper wall of the chainway to lower edges spaced below the lower edges of the flanges, spacing between the side walls defining width of the chainway and being less than the spacing between the flanges of the link, thus permitting the flanges to straddle the side walls, so that, when downwards force closure from weight of material on the chain maintains the link against the chainway, motion of the link relative to the chainway is essentially rectilinear motion of translation only.

* * * * *